United States Patent
Kim et al.

(10) Patent No.: US 9,202,629 B2
(45) Date of Patent: Dec. 1, 2015

(54) MULTILAYER CERAMIC ELECTRONIC COMPONENT

(71) Applicant: SAMSUNG ELECTRO-MECHANICS CO., LTD., Suwon, Gyunggi-do (KR)

(72) Inventors: Jong Han Kim, Gyunggi-do (KR); Jeong Ryeol Kim, Gyunggi-do (KR); Su Hwan Cho, Gyunggi-do (KR); Jae Man Park, Gyunggi-do (KR); Jae Yeol Choi, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 177 days.

(21) Appl. No.: 14/013,291

(22) Filed: Aug. 29, 2013

(65) Prior Publication Data

US 2014/0376150 A1    Dec. 25, 2014

(30) Foreign Application Priority Data

Jun. 19, 2013    (KR) ........................ 10-2013-0070482

(51) Int. Cl.
   *H01G 4/008*    (2006.01)
   *H01G 4/30*    (2006.01)
   *H01G 4/012*    (2006.01)
   *H01G 4/12*    (2006.01)

(52) U.S. Cl.
   CPC .............. *H01G 4/30* (2013.01); *H01G 4/0085* (2013.01); *H01G 4/012* (2013.01); *H01G 4/12* (2013.01)

(58) Field of Classification Search
   USPC ................ 361/303–305, 301.2, 301.4, 306.1, 361/306.3, 321.1, 321.2
   See application file for complete search history.

(56) References Cited

U.S. PATENT DOCUMENTS 8,102,639 B2 *    1/2012    Kasuya et al. ................ 361/305

FOREIGN PATENT DOCUMENTS

JP    05-054713 A    3/1993
JP    2002-164248 A    6/2002

* cited by examiner

*Primary Examiner* — Nguyen T Ha
(74) *Attorney, Agent, or Firm* — McDermott Will & Emery LLP (57) ABSTRACT

There is provided a multilayer ceramic electronic component including, a ceramic body including dielectric layers, internal electrodes disposed in the ceramic body to face each other with the dielectric layers interposed therebetween, and having an average thickness of 1.0 μm or less, and external electrodes formed on outer surfaces of the ceramic body and electrically connected to the internal electrodes, wherein at least one of the internal electrodes is formed of only a conductive metal.

10 Claims, 3 Drawing Sheets

MULTILAYER CERAMIC ELECTRONIC COMPONENT

CROSS-REFERENCE TO RELATED APPLICATIONS

This application claims the priority of Korean Patent Application No. 10-2013-0070482 filed on Jun. 19, 2013, in the Korean Intellectual Property Office, the disclosure of which is incorporated herein by reference.

BACKGROUND OF THE INVENTION

1. Field of the Invention

The present invention relates to a multilayer ceramic electronic component, and more particularly, to a multilayer ceramic electronic component having excellent reliability and a method of manufacturing the same.

2. Description of the Related Art

Generally, electronic components using a ceramic material, such as a capacitor, an inductor, a piezoelectric element, a varistor, a thermistor, or the like, include a ceramic body made of a ceramic material, internal electrodes formed in the ceramic body, and external electrodes mounted on external surfaces of the ceramic body so as to be connected to the internal electrodes.

Among ceramic electronic components, a multilayer ceramic capacitor includes a plurality of stacked dielectric layers, internal electrodes disposed to face each other, having the dielectric layer interposed therebetween, and external electrodes electrically connected to the internal electrodes.

Multilayer ceramic capacitors have been widely used as components in mobile communications devices such as laptop computers, personal digital assistants (PDAs), mobile phones, and the like, due to advantages thereof such as a small size, high capacitance, ease of mounting, or the like.

In accordance with the recent trend toward electronic devices having high performance as well as compact, slim form factors, demands have been made for electronic components having a small size, high performance, and high capacitance.

In particular, as CPUs are increasingly being provided with higher speeds and the slimness, lightweightness, digitalization, and multifunctionalization of devices have increased, research into technology for implementing multilayer ceramic capacitor characteristics such as miniaturization, thinness, high capacitance, low impedance in a high frequency region, and the like, have been actively ongoing.

In particular, the internal electrodes are thinned, such that the internal electrodes have defects in connectivity thereof, which causes to deteriorate reliability of the multilayer ceramic electronic component.

RELATED ART DOCUMENT (Patent Document 1) Japanese Patent Laid-Open Publication No. JP 2002-164248

SUMMARY OF THE INVENTION

An aspect of the present invention provides a multilayer ceramic electronic component having excellent reliability and a method of manufacturing the same.

According to an aspect of the present invention, there is provided a multilayer ceramic electronic component, including: a ceramic body including dielectric layers; internal electrodes disposed in the ceramic body to face each other with the dielectric layers interposed therebetween, and having an average thickness of 1.0 μm or less; and external electrodes formed on outer surfaces of the ceramic body and electrically connected to the internal electrodes, wherein at least one of the internal electrodes is formed of only a conductive metal.

The conductive metal may be formed of nickel (Ni) particles and metal particles having oxidation resistance higher than that of the nickel (Ni) particles.

When an average particle diameter of the nickel (Ni) particles is defined as Dn and an average particle diameter of the metal particles having oxidation resistance higher than that of the nickel (Ni) particles is defined as Ds, $1/72 \leq Ds/Dn \leq 1/2$ may be satisfied.

The metal particles having oxidation resistance higher than that of the nickel (Ni) particles may be particles of at least one selected from a group consisting of cobalt (Co) and copper (Cu).

A content ratio of the metal particles having oxidation resistance higher than that of the nickel (Ni) particles, to the nickel (Ni) particles, may be 1.0% or greater and 25.0% or less.

The metal particles having oxidation resistance higher than that of the nickel (Ni) particles may have a surface oxidation amount of 1.0 wt % to 100 wt % based on 100 wt % of the metal particles having oxidation resistance higher than that of the nickel (Ni) particles.

When a ratio of a length of a portion of each internal electrode in which the internal electrode is actually formed, to the entire length of the internal electrode is defined as connectivity (C) of the internal electrode, the connectivity (C) of 80% or higher may be satisfied.

According to another aspect of the present invention, there is provided a multilayer ceramic electronic component including: a ceramic body including dielectric layers; internal electrodes disposed in the ceramic body to face each other with the dielectric layers interposed therebetween, and having an average thickness of 1.0 μm or less; and external electrodes formed on outer surfaces of the ceramic body and electrically connected to the internal electrodes, wherein the internal electrodes have metal oxide particles added to conductive metal particles.

When an average particle diameter of the conductive metal particles is defined as Dn and an average particle diameter of the metal oxide particles is defined as Ds, $1/72 \leq Ds/Dn \leq 1/2$ may be satisfied.

The metal oxide particles may be particles of at least one selected from a group consisting of cobalt (Co) and copper (Cu).

A content ratio of the metal oxide particles to the conductive metal particles may be 1.0% or greater and 25.0% or less.

The metal oxide particles may have a surface oxidation amount of 1.0 wt % to 100 wt % based on 100 wt % of the metal oxide particles.

When a ratio of a length of a portion of each internal electrode in which the internal electrode is actually formed, to the entire length of the internal electrode is defined as connectivity (C) of the internal electrode, the connectivity (C) of 80% or higher may be satisfied.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

An embodiment of the present invention relates to a ceramic electronic component. Examples of the electronic components using a ceramic material may include a capacitor, an inductor, a piezoelectric element, a varistor, a thermistor, and the like. Hereinafter, a multilayer ceramic capacitor as an example of the ceramic electronic component will be described.

Figure 1:
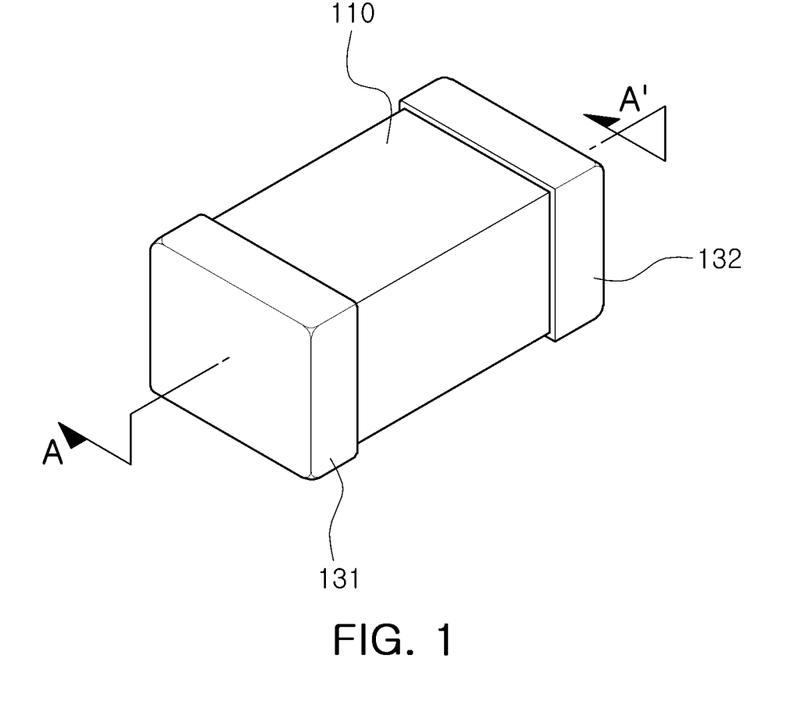
FIG. 1 is a schematic perspective view showing a multilayer ceramic capacitor according to an embodiment of the present invention.
Figure 2:
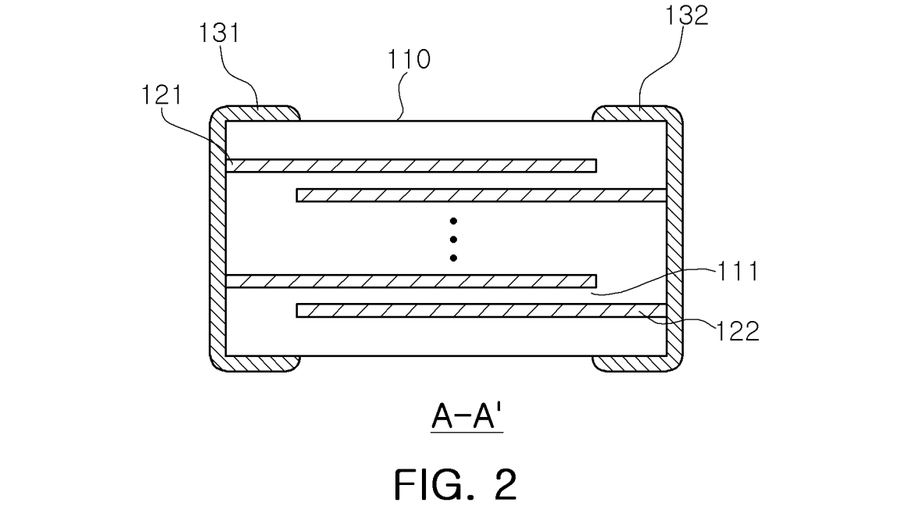
FIG. 2 is a schematic cross-sectional view showing the multilayer ceramic capacitor taken along line A-A' of FIG. 1.

FIG. 1 is a schematic perspective view showing a multilayer ceramic capacitor according to an embodiment of the present invention. FIG. 2 is a schematic cross-sectional view showing the multilayer ceramic capacitor taken along line A-A' of FIG. 1.

Referring to FIGS. 1 and 2, the multilayer ceramic capacitor according to the embodiment of the present invention may include a ceramic body 110; internal electrodes 121 and 122 formed in the ceramic body; and external electrodes 131 and 132 formed on outer surfaces of the ceramic body 110.

The ceramic body 110 may generally have a rectangular parallelepiped shape, but is not specifically limited thereto in view of a shape. In addition, the ceramic body may have a size of 0.6 mm×0.3 mm, and the multilayer ceramic capacitor according to the embodiment of the present invention may be a multilayer ceramic capacitor having increased numbers of stacked layers and high capacitance of 2.2 μF or higher. However, the present invention is not specifically limited thereto.

The ceramic body 110 may be formed by stacking a plurality of dielectric layers 111. The plurality of dielectric layers 111 configuring the ceramic body 110 may be in a sintered state and may be integrated such that a boundary between adjacent dielectric layers may not be readily apparent.

The dielectric layers 111 may be formed by sintering ceramic green sheets including a ceramic powder.

The ceramic powder is not specifically limited as long as it is generally used in the art.

As the ceramic powder, a $BaTiO_3$-based ceramic powder may be used. However, the present invention is not limited thereto. Examples of the $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, having Ca, Zr, or the like, introduced in $BaTiO_3$, but is not limited thereto.

An average particle size of the ceramic powder may be 1.0 μm or less, but is not limited thereto.

In addition, the ceramic green sheets may include a transition metal, a rare-earth element, Mg, Al, or the like, in addition to the ceramic powder.

A thickness of each dielectric layer 111 may be appropriately changed according to a capacitance design of the multilayer ceramic capacitor. For example, the thickness of each dielectric layer 111 formed between the internal electrodes 121 and 122 adjacent to each other after a sintering process may be 1.0 μm or less, but is not limited thereto.

According to the embodiment of the present invention, the external electrodes 131 and 132 may be formed on the outer surfaces of the ceramic body 110 and electrically connected to the internal electrodes 121 and 122.

More specifically, the external electrodes 131 and 132 may be configured of the first external electrode 131 electrically connected to the first internal electrode 121 exposed to one surface of the ceramic body 110 and the second external electrode 132 electrically connected to the second internal electrode 122 exposed to the other surface of the ceramic body 110.

In addition, although not shown, the first and second internal electrodes 121 and 122 may be exposed to at least one surface of the ceramic body. In addition, the first and second internal electrodes 121 and 122 may be exposed to the same surface of the ceramic body.

The external electrodes 131 and 132 may be formed using a conductive paste including a conductive material. The conductive material included in the conductive paste may be Ni, Cu, or an alloy thereof, but is not specifically limited thereto.

Each thickness of the external electrodes 131 and 132 may be appropriately determined according to a usage thereof, or the like, and for example, may be 10 to 50 μm.

The internal electrodes 121 and 122 may be formed in the ceramic body 110. The internal electrodes 121 and 122 may be formed and stacked on respective dielectric layers and sintered to thereby be provided in the ceramic body 110, having respective dielectric layers interposed therebetween.

The internal electrodes may be pairs of the first internal electrode 121 and the second internal electrode 122 having different polarities and disposed to face each other according to a direction in which the dielectric layers are stacked. Ends of the first and second internal electrodes 121 and 122 may be alternately exposed to one surfaces of the ceramic body 110.

Each thickness of the internal electrodes 121 and 122 may be appropriately determined according to a usage thereof, or the like, and for example, may be 1.0 μm or less. Alternatively, each thickness of the internal electrodes 121 and 122 may be selected in a range of 0.1 to 1.0 μm.

The thicknesses of the dielectric layer 111 and the internal electrodes 121 and 122 may be measured from an image obtained by scanning a cross-section of the ceramic body 110 in a length direction using scanning electron microscope (SEM), as shown in FIG. 2, but a method of measuring the thicknesses is not specifically limited thereto.

For example, as illustrated in FIG. 2, with respect to any dielectric layer extracted from an image obtained by scanning the cross-section of the ceramic body 110 in a length-thickness (L-T) direction cut in a central portion of the ceramic body 110 in a width (W) direction, using the scanning electron microscope (SEM), respective thicknesses of the dielectric layer may be measured at thirty points thereof having equal intervals therebetween in a length direction.

In addition, thicknesses of upper and lower internal electrodes may be measured at the points.

The thirty points having equal intervals therebetween may be measured in a capacitance formation part and the capacitance formation part indicates a region in which the first and second internal electrodes 121 and 122 are overlapped with each other.

The internal electrodes 121 and 122 may be formed using a conductive paste for an internal electrode according to the embodiment of the present invention. The conductive paste for an internal electrode according to the embodiment of the present invention may include a conductive metal and a metal oxide. A detailed description thereof will be provided below.

According to the embodiment of the present invention, at least one of the internal electrodes 121 and 122 may be formed of only the conductive metal.

At least one of the internal electrodes 121 and 122 may be formed of only the conductive metal, which may mean that a ceramic additive and a pore are not present in any one of the internal electrodes.

That is, a ratio of an area of a non-electrode region to an overall area of the internal electrode in a predetermined area of the internal electrode may be 0.

More specifically, the predetermined area of the internal electrode is formed of only the conductive metal, such that other ceramic materials or pores are not present therein, except for the electrode.

A method of measuring at least one of the internal electrodes 121 and 122 formed of only the conductive metal is not specifically limited, but may be measured from an image obtained by scanning the cross-section of the ceramic body 110 in the length direction, using the scanning electron microscope (SEM), as shown in FIG. 2.

For example, as shown in FIG. 2, with respect to any internal electrode extracted from an image obtained by scanning the cross-section of the ceramic body 110 in the length-thickness (L-T) direction cut in a central portion of the ceramic body 110 in the width (W) direction, using the scanning electron microscope (SEM), respective thicknesses of the internal electrode may be measured at thirty points thereof having equal intervals therebetween in the length direction.

The thirty points having equal intervals therebetween may be measured in the capacitance formation part in which the first and second internal electrodes 121 and 122 are overlapped with each other.

Alternatively, a ratio of an area of a non-electrode region to an area of an electrode region may be measured within an area of 10 μm×5 μm in the cross-section in the length and thickness (L-T) direction.

Figure 3:
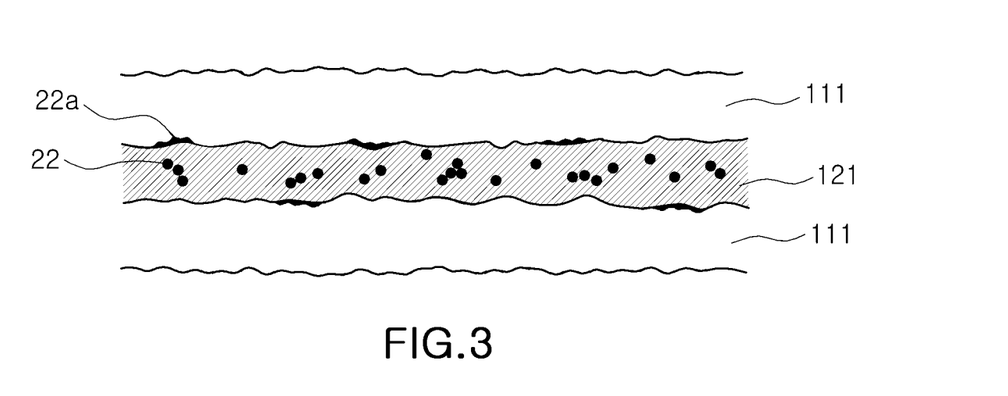
FIG. 3 is a partially enlarged view schematically showing an internal electrode according to the embodiment of the present invention.

In addition, according to the embodiment of the present invention, the conductive metal may be formed of nickel (Ni) particles 21 and metal particles 22 having oxidation resistance higher than that of the nickel (Ni) particles.

The metal particles 22 having oxidation resistance higher than that of the nickel (Ni) particles 21 may be particles of at least one metal selected from a group consisting of cobalt (Co) and copper (Cu).

The metal particles 22 having higher oxidation resistance are hardly oxidized or easily reduced as compared to the nickel (Ni) particles in a process of reducing and sintering the ceramic body 110 and may be added in the form of oxides, to the internal electrode paste for forming the internal electrodes, as compared to the nickel (Ni) particles 21.

The metal particles 22 having oxidation resistance higher than that of the nickel (Ni) particles 21 added in the form of oxides to the paste may be reduced in the reduction and sintering process and remain in the form of metal in the internal electrodes.

FIG. 3 is a partially enlarged view schematically showing the internal electrode 121 according to the embodiment of the present invention.

Referring to FIG. 3, at least one of the internal electrodes 121 and 122 according to the embodiment of the present invention may be formed of only the conductive metal, and the conductive metal may be formed of the nickel (Ni) particles 21 and the metal particles 22 of at least one metal selected from a group consisting of cobalt (Co) and copper (Cu), having oxidation resistance higher than the nickel (Ni) particles.

The metal particles 22 of at least one metal selected from a group consisting of cobalt (Co) and copper (Cu) having oxidation resistance higher than that of the nickel (Ni) particles may be trapped in an interface of the nickel (Ni) particles 21 forming the internal electrode, that is, a grain boundary.

In addition, the metal particles 22 of at least one metal selected from a group consisting of cobalt (Co) and copper (Cu) may be partially oxidized.

The metal particles 22 of at least one metal selected from a group consisting of cobalt (Co) and copper (Cu) may be trapped in the interface of the nickel (Ni) particles 21 in a process of sintering the nickel (Ni) particles 21.

In addition, a metal layer 22a including the metal particles 22 of at least one metal selected from a group consisting of cobalt (Co) and copper (Cu) may be formed in a region of a surface of the internal electrode 121, that is, a region of the interface between the dielectric layer 111 and the internal electrode 121.

The metal layer 22a including the metal particles 22 of at least one metal selected from a group consisting of cobalt (Co) and copper (Cu) may function as a conductor, such that the capacitance of the multilayer ceramic capacitor may not be deteriorated.

In addition, since the ceramic additive which may be added to delay a sintering shrinkage of the internal electrode is not generally used in the sintering process of the ceramic body 110, at least one of the internal electrodes 121 and 122 after sintering process may be formed of only the conductive metal, according to the embodiment of the present invention.

That is, in the case in which the ceramic additive is generally used, the ceramic additive or a pore is present in the internal electrode after sintering process, such that the capacitance of the multilayer ceramic capacitor may be deteriorated. However, according to the embodiment of the present invention, at least one of the internal electrodes 121 and 122 after the sintering process may be formed of only the conductive metal, such that the capacitance of the multilayer ceramic capacitor may be hardly deteriorated.

In addition, in the case in which the ceramic additive is generally used, a portion of the ceramic additive is squeezed out in the sintering process of the ceramic body, leading to an increase in the thickness of the dielectric layer.

However, according to the embodiment of the present invention, since the ceramic additive is not used, the thicknesses of the dielectric layer 111 and the internal electrodes 121 and 122 may not be increased, such that a multilayer ceramic capacitor having a subminiature size and high capacitance may be implemented.

It may be clearly understood from the descriptions of a conductive paste composition for an internal electrode and a process of forming the internal electrode, to be described later.

According to the embodiment of the present invention, when an average particle diameter of the nickel (Ni) particles 21 is defined as Dn and an average particle diameter of the metal particles 22 having oxidation resistance higher than that of the nickel (Ni) particles is defined as Ds, $1/72 \le Ds/Dn \le 1/2$ may be satisfied.

The average particle diameter Dn of the nickel (Ni) particles 21 and the average particle diameter Ds of the metal particles 22 having oxidation resistance higher than that of the nickel (Ni) particles 21 are controlled to satisfy $1/72 \le Ds/Dn \le 1/2$, such that the connectivity of the internal electrode may be implemented in an amount equal to 80% or higher as described below to obtain a multilayer ceramic capacitor having a subminiature size and high capacitance.

In the case in which the ratio (Ds/Dn) of the average particle diameter Ds of the metal particles 22 having oxidation resistance higher than that of the nickel (Ni) particles 21, to the average particle diameter Dn of the nickel (Ni) particles 21, is less than $1/72$ or more than $1/2$, the connectivity of the internal electrode may not be implemented in an amount equal to 80% or higher, such that a multilayer ceramic capacitor having a subminiature size and high capacitance may not be obtained.

According to the embodiment of the present invention, a content ratio of the metal particles having oxidation resistance higher than that of the nickel (Ni) particles, to the nickel (Ni) particles may be 1.0% or greater and 25.0% or less.

The content ratio of the metal particles having oxidation resistance higher than that of the nickel (Ni) particles, to the nickel (Ni) particles is controlled to be 1.0% or greater and 25.0% or less, such that the connectivity of the internal electrode may be implemented in an amount equal to 80% or higher to obtain a multilayer ceramic capacitor having a subminiature size and high capacitance.

In the case in which the content ratio of the metal particles having oxidation resistance higher than that of the nickel (Ni) particles, to the nickel (Ni) particles is less than 1.0% or greater than 25.0%, the connectivity of the internal electrode may not be implemented in an amount equal to 80% or higher, such that a multilayer ceramic capacitor having a subminiature size and high capacitance may not be obtained.

Hereinafter, the conductive paste composition for an internal electrode of the multilayer ceramic electronic component according to the embodiment of the present invention will be described.

Figure 4A:
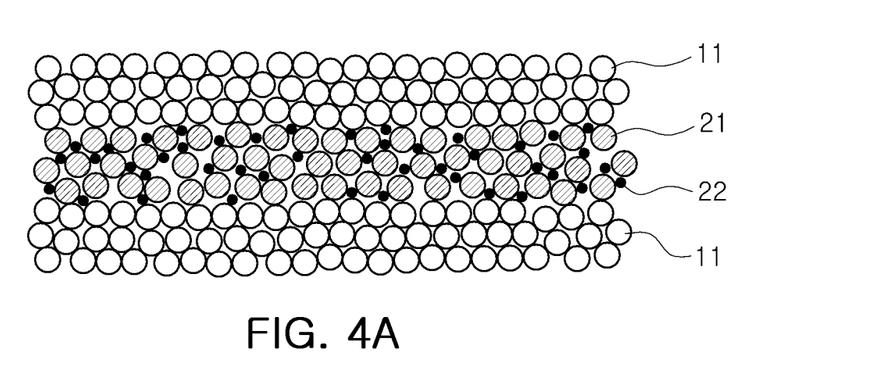
FIGS. 4A and 4B are views schematically showing a sintering shrinkage behavior of a conductive paste for an internal electrode according to the embodiment of the present invention.
Figure 4B:
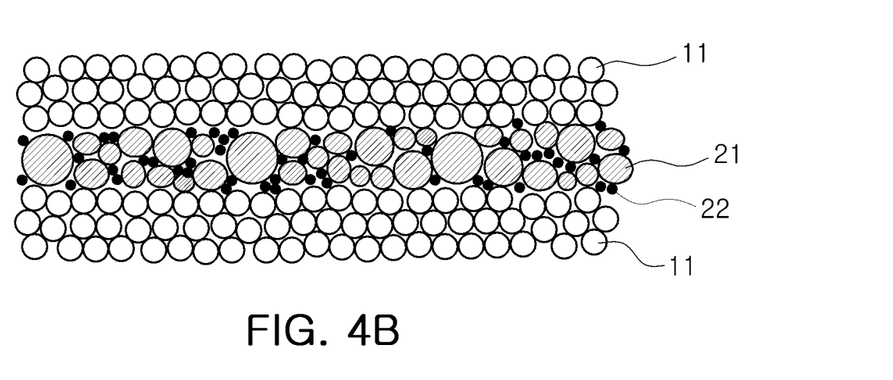

FIGS. 4A and 4B are views schematically showing a sintering shrinkage behavior of a conductive paste for an internal electrode according to the embodiment of the present invention. Hereinafter, the conductive paste composition for an internal electrode will be described with reference to FIGS. 4A and 4B.

The conductive paste composition for an internal electrode according to the embodiment of the present invention may include the nickel (Ni) particles 21 and the metal particles 22 of at least one metal selected from a group consisting of cobalt (Co) and copper (Cu) having oxidation resistance higher than the nickel (Ni) particles.

With the conductive paste composition for an internal electrode according to the embodiment of the present invention, a sintering shrinkage temperature of the internal electrode may be increased, and the connectivity of the internal electrode may be improved.

The average particle diameter of the nickel (Ni) particles 21 may be 400 nm or less, but is not specifically limited thereto.

More specifically, the average particle diameter of the nickel (Ni) particles 21 may be 50 to 400 nm.

The metal particles 22 of at least one metal selected from a group consisting of cobalt (Co) and copper (Cu) included in the conductive paste composition may have oxidation resistance higher than that of the nickel (Ni) particles 21.

As the metal particle 22, a mixture including at least one thereof may be used.

The metal particles 22 of at least one metal selected from a group consisting of cobalt (Co) and copper (Cu) may have the average particle diameter smaller than that of the nickel (Ni) particles 21.

When the average particle diameter of the nickel (Ni) particles 21 is defined as Dn and the average particle diameter of the metal particles 22 of at least one metal selected from a group consisting of cobalt (Co) and copper (Cu) is defined as Ds, $1/72 \le Ds/Dn \le 1/2$ may be satisfied.

The metal particles 22 of at least one metal selected from a group consisting of cobalt (Co) and copper (Cu) may have the average particle diameter of 10 to 100 nm, but is not limited thereto.

The metal particles 22 of at least one metal selected from a group consisting of cobalt (Co) and copper (Cu) may have the average particle diameter smaller than that of the nickel (Ni) particles 21, such that the metal particles 22 may be distributed between the nickel (Ni) particles 21.

The metal particles 22 of at least one metal selected from a group consisting of cobalt (Co) and copper (Cu) may enable a sintering shrinkage initiation temperature of the nickel (Ni) particles 21 to be delayed and allow the sintering shrinkage of the nickel (Ni) particles 21 to be suppressed.

More specifically, the metal particles 22 of at least one metal selected from a group consisting of cobalt (Co) and copper (Cu) may prevent contact between the nickel particles at the time of sintering shrinkage of the nickel (Ni) particles 21 to suppress grain growth of the nickel (Ni) particles.

According to the embodiment of the present invention, the metal particles of at least one metal selected from a group consisting of cobalt (Co) and copper (Cu) having oxidation resistance higher than the nickel (Ni) particles may have a surface oxidation amount of 1.0 wt % to 100 wt % based on 100 wt % of the metal particles of at least one metal selected from a group consisting of cobalt (Co) and copper (Cu).

The surface oxidation amount is controlled to be 1.0 wt % to 100 wt % based on 100 wt % of the metal particles of at least one metal selected from a group consisting of cobalt (Co) and copper (Cu), such that the connectivity of the internal electrode may be implemented in an amount equal to 80% or higher to obtain a multilayer ceramic capacitor having a subminiature size and high capacitance.

In the case in which the surface oxidation amount is less than 1.0 wt % based on 100 wt % of the metal particles of at least one metal selected from a group consisting of cobalt (Co) and copper (Cu), the connectivity of the internal electrode may not be implemented in an amount equal to 80% or higher, such that a multilayer ceramic capacitor having a subminiature size and high capacitance may not be obtained.

The conductive paste composition for an internal electrode according to the embodiment of the present invention may further include a dispersant, a binder, a solvent, and the like.

Examples of the binder may include polyvinylbutyral, a cellulose-based resin, and the like, but is not limited thereto. Polyvinyl butyral may have a high degree of adhesion to improve adhesive strength between the conductive paste for an internal electrode and the ceramic green sheet.

The cellulose-based resin may have a chair shaped structure, and in the case in which deformation occurs, the cellulose-based resin may be easily recovered due to elasticity thereof. The cellulose-based resin may be included, such that a flat printed surface may be secured.

Examples of the solvent may include a butylcarbitol-based solvent, a kerosene-based solvent, and a terpineol-based solvent, but is not specifically limited thereto.

In general, after the conductive paste composition for an internal electrode may be printed on the ceramic green sheets and the ceramic green sheets are stacked, the conductive paste composition may be sintered together with the ceramic green sheets.

In addition, in the case in which a base metal is used for the internal electrode, when the sintering process is performed in the atmosphere, the internal electrode may be oxidized.

Therefore, the ceramic green sheet and the internal electrode may be simultaneously sintered in a reduction atmosphere.

The dielectric layer of the multilayer ceramic capacitor may be formed by sintering the ceramic green sheet at a high temperature of about 1100° C. or higher.

In the case in which the base metal such as nickel (Ni), or the like, is used for the internal electrode, the internal electrode may be oxidized from 400° C. and a sintering shrinkage thereof may be initiated, and the internal electrode may be rapidly sintered at a temperature of 1000° C. or higher. In the case in which the internal electrodes are rapidly sintered, the internal electrodes may be agglomerated or be cut due to an excessive sintering of the internal electrodes, and the connectivity and the capacitance of the internal electrode may be deteriorated. In addition, an internal structural defect such as a crack, or the like, may occur in the multilayer ceramic capacitor after the sintering.

Therefore, it is necessary to significantly reduce a difference in a shrinkage rate between the internal electrode and the dielectric layer by delaying the sintering shrinkage initiation temperature of the nickel (Ni) particles at which the nickel (Ni) particles starts to be sintered at a relatively low temperature of 400 to 500° C.

FIGS. 4A and 4B are views schematically showing a sintering shrinkage behavior of a conductive paste for an internal electrode according to the embodiment of the present invention. FIG. 4A schematically shows a state before the sintering shrinkage initiation of the nickel (Ni) particles 21 in the initial stage of a sintering process, and FIG. 4B schematically shows a state in which the sintering shrinkage of the nickel (Ni) particles 21 is performed in accordance with an increase in temperature.

In FIGS. 4A and 4B, ceramic particles 11 may be sintered and form the dielectric layer 111 as shown in FIG. 2.

Referring to FIGS. 4A and 4B, in the initial stage of the sintering process, the nickel (Ni) particles 21 are shrunk and the metal particles 22 of at least one metal selected from a group consisting of cobalt (Co) and copper (Cu) may be escaped from between the nickel (Ni) particles 21 and move toward the ceramic particles 11.

In general, before the ceramic particles are shrunk, the nickel (Ni) particles and the metal particles may be sintered to form the internal electrodes, and the internal electrodes may be agglomerated during the shrinkage of the ceramic particles, such that the connectivity of the internal electrode may be deteriorated.

However, according to the embodiment of the present invention, in the case in which the metal particles 22 of at least one metal selected from a group consisting of cobalt (Co) and copper (Cu) in the form of oxides, having oxidation resistance higher than that of the nickel (Ni) particles are dispersed in the nickel (Ni) particles 21, the sintering of the nickel (Ni) particles 21 may be suppressed until a temperature reaches at about 1000° C. or higher.

The sintering of the nickel particles 21 may be suppressed as much as possible, until a temperature reaches at about 1000° C., and the sintering of the ceramic particles 11 may be then initiated.

When the ceramic particles 11 are densified, the densification of the internal electrode is also initiated and the sintering process may be rapidly performed.

Here, in the case of controlling a rising temperature rate, the metal particles 22 of at least one metal selected from a group consisting of cobalt (Co) and copper (Cu) in the form of oxides may not be escaped from between the nickel particles 21, but may be trapped in a grain boundary of the nickel particles 21 to suppress a grain growth of the nickel particles 21, as shown in FIG. 3.

Therefore, the agglomeration of the internal electrodes may be suppressed, such that the connectivity of the internal electrodes may be increased.

In addition, a portion of the metal particles 22 of at least one metal selected from a group consisting of cobalt (Co) and copper (Cu) in the form of oxides may be left on a surface of the internal electrode, and distributed in a small amount in the interface between the dielectric layer 111 and the internal electrode 121.

In the case in which the metal particles of at least one metal selected from a group consisting of cobalt (Co) and copper (Cu) in the form of oxides are reduced and present in the interface between the dielectric layer 111 and the internal electrode 121, the electrode connectivity may be excellent to increase an effective electrode area.

In addition, the metal particles of at least one metal selected from a group consisting of cobalt (Co) and copper (Cu) in the form of oxides may be reduced to form the metal layer 22a.

The metal layer 22a formed by reducing the metal particles of at least one metal selected from a group consisting of cobalt (Co) and copper (Cu) in the form of oxides may function as the conductor according to a content ratio of the metal particles.

In addition, in the case of controlling the content of the metal particles of at least one metal selected from a group consisting of cobalt (Co) and copper (Cu) in the form of oxides, even in the case in which a portion of the metal particles of at least one metal selected from a group consisting of cobalt (Co) and copper (Cu) are present in the form of oxides, the capacitance of the multilayer ceramic capacitor may not be hardly deteriorated.

Recently, in accordance with lightness and miniaturization of the multilayer ceramic capacitor, the internal electrodes are thinned. In order to form the thin internal electrode, fine metal particles may be used. However, in this case, it is difficult to control the sintering shrinkage of the metal particles and to secure the connectivity of the internal electrode.

However, according to the embodiment of the present invention, cobalt (Co) or copper (Cu) particles having oxidation resistance higher than that of the nickel particles are included in the conductive paste for an internal electrode, whereby the sintering shrinkage of the nickel particles forming the internal electrode may be suppressed.

In addition, the metal particles of at least one metal selected from a group consisting of cobalt (Co) and copper (Cu) may be trapped in the internal electrodes, such that at least one of the internal electrodes may be formed of only the conductive metal to improve the connectivity of the internal electrode.

According to the embodiment of the present invention, the connectivity of the internal electrode may be defined as a ratio (length of a portion of the internal electrode in which the internal electrode is actually formed/entire length of the internal electrode) of the length of a portion of the internal electrode in which the internal electrode is actually formed, to the entire length of the internal electrode.

The entire length of the internal electrode and the length of a portion of the internal electrode in which the internal electrode is actually formed may be measured from an optical image obtained by scanning the cut cross-section of the multilayer ceramic capacitor as described above.

More specifically, the ratio of the length of a portion of the internal electrode in which the internal electrode is actually formed, to the entire length of the internal electrode may be measured from the image obtained by scanning the cross-section of the ceramic body in the length direction, cut in the center portion of the ceramic body in the width direction.

In the embodiment of the present invention, the entire length of the internal electrode may refer to a length of the internal electrode including a gap formed between internal electrode portions, and the length of a portion of the internal electrode in which the internal electrode is actually formed may refer to a length of the internal electrode excluding the gap formed between the internal electrode portions.

The gap may indicate a pore penetrating through the internal electrode, and does not include a pore only formed in a portion of the surface of the internal electrode or a pore formed within the internal electrode.

According to the embodiment of the present invention, the length of a portion of the internal electrode in which the internal electrode is actually formed may be calculated by subtracting a length of the gap from the entire length (T) of the internal electrode.

When the ratio of the length of a portion of the internal electrode in which the internal electrode is actually formed, to the entire length of the internal electrode is defined as connectivity (C) of the internal electrode, the connectivity (C) of the internal electrode may be 80% or higher.

A multilayer ceramic electronic component according to another embodiment of the present invention may include the ceramic body 110 including the dielectric layers 111; the internal electrodes 121 and 122 disposed in the ceramic body 110 to face each other with the dielectric layers 111 interposed therebetween, and having an average thickness of 1.0 μm or less; and the external electrodes 131 and 132 formed on outer surfaces of the ceramic body 110 and electrically connected to the internal electrodes 121 and 122, wherein the internal electrodes 121 and 122 have metal oxide particles added to conductive metal particles.

According to another embodiment of the present invention, in the case in which an average particle diameter of the conductive metal particles is defined as Dn and an average particle diameter of the metal oxide particles is defined as Ds, $1/72 \leq Ds/Dn \leq 1/2$ may be satisfied.

According to another embodiment of the present invention, the metal oxide particles may be particles of at least one selected from a group consisting of cobalt (Co) and copper (Cu).

According to another embodiment of the present invention, a content ratio of the metal oxide particles to the conductive metal particles may be 1.0% or greater and 25.0% or less.

According to another embodiment of the present invention, the metal oxide particles may have a surface oxidation amount of 1.0 wt % to 100 wt % based on 100 wt % of the metal oxide particles.

When the ratio of the length of a portion of the internal electrode in which the internal electrode is actually formed, to the entire length of the internal electrode is defined as connectivity (C) of the internal electrode, the connectivity (C) of the internal electrode may be 80% or higher.

In the multilayer ceramic electronic component according to the embodiment of the present invention, the metal oxide particles may indicate particles of at least one metal selected from a group consisting of cobalt (Co) and copper (Cu) in the form of oxides, having oxidation resistance higher than that of the nickel particles.

In the multilayer ceramic electronic component according to the embodiment of the present invention, a description of the same components as those of the multilayer ceramic electronic component according to another embodiment of the present invention will be omitted in order to avoid overlapped descriptions.

Hereinafter, a method of manufacturing the multilayer ceramic capacitor according to another embodiment of the present invention will be described.

According to the embodiment of the present invention, a plurality of ceramic green sheets may be prepared. A ceramic powder, a binder, a solvent, and the like may be mixed to prepare a slurry, and the thus obtained slurry may be used to manufacture a sheet type ceramic green sheet having a thickness of several μm by a doctor blade method. The ceramic green sheet then may be sintered to form a single dielectric layer 111, as shown in FIG. 2.

Next, a conductive paste for an internal electrode may be applied to the ceramic green sheet, thereby forming an internal electrode pattern. The internal electrode pattern may be formed by a screen printing method or a gravure printing method.

A conductive paste composition for an internal electrode may be prepared according to the embodiment of the present invention, and a specific component and a specific content thereof are as described above.

Then, a plurality of ceramic green sheets may be stacked and pressed in a stacking direction to compress the stacked ceramic green sheets and the paste for an internal electrode. Therefore, a ceramic laminate in which the ceramic green sheets and the internal electrodes are alternately stacked may be manufactured.

Next, the ceramic laminate may be cut into regions corresponding to single capacitors, thereby producing chips. Here, the ceramic laminate may be cut such that both ends of the internal electrode pattern are alternately exposed through side surfaces thereof. Then, the chip may be sintered to produce a ceramic body. As described above, the sintering process may be performed under a reduction atmosphere. In addition, the sintering process may be performed by controlling a rising temperature rate. The rising temperature rate may range from 3° C./60 s to 50° C./60 s, but it not limited thereto.

Then, external electrodes may be formed to be electrically connected to internal electrodes exposed to end surfaces of the ceramic body, while covering the end surfaces of the ceramic body. Next, a plating treatment may be performed on surfaces of the external electrodes, using nickel, tin, or the like.

As described above, the metal particles 22 of at least one metal selected from a group consisting of cobalt (Co) and copper (Cu) may be trapped in the grain boundary of the internal electrode 121, and therefore, the connectivity of the internal electrode may be improved.

In addition, the metal layer 22a including the metal particles of at least one metal selected from a group consisting of cobalt (Co) and copper (Cu) may be formed in a region of the interface between the dielectric layer 111 and the internal electrode 121.

The metal layer 22a may function as a conductor, such that the capacitance of the multilayer ceramic capacitor may not be deteriorated.

According to the embodiment of the present invention, the conductive paste composition for an internal electrode may be prepared and the conductive paste composition may be used to manufacture the multilayer ceramic capacitor.

In the conductive paste composition, nickel (Ni) particles may be used as the conductive metal particles, and cobalt (Co) particles may be used as the metal oxide particles to be added thereto.

A particle diameter ratio and a content ratio of the cobalt (Co) particles to the nickel particles, and electrode connectivity of the internal electrode according to a surface oxidation amount of the cobalt (Co) particles as the metal oxide particles were shown in the following Table 1.

TABLE 1

| Sample No. | Ds/Dn | Content of Additive (wt %/nickel) | Surface Oxidation Amount (wt %) | Electrode Connectivity (%) |
|---|---|---|---|---|
| *1  | 2/1   | 12.3 | 0.95  | 75.3 |
| *2  | 1/1   | 3.4  | 1.23  | 73.5 |
| *3  | 2/3   | 15.7 | 5.65  | 76.4 |
| *4  | 3/5   | 16.4 | 53.57 | 71.2 |
| 5   | 1/2   | 1.0  | 32.45 | 85.6 |
| *6  | 1/2   | 3.5  | 0.97  | 78.8 |
| 7   | 1/2   | 7.6  | 15.30 | 87.5 |
| 8   | 1/3   | 13.5 | 35.22 | 83.5 |
| *9  | 1/3   | 25.3 | 42.67 | 78.4 |
| 10  | 1/4   | 12.2 | 65.31 | 95.3 |
| 11  | 1/4   | 7.0  | 9.85  | 91.2 |
| 12  | 1/6   | 5.3  | 1.51  | 88.5 |
| 13  | 1/6   | 5.3  | 0.97  | 85.2 |
| 14  | 1/6   | 18.2 | 3.45  | 90.2 |
| 15  | 1/12  | 12.2 | 1.0   | 96.3 |
| 16  | 1/12  | 24.3 | 77.54 | 94.5 |
| 17  | 1/36  | 1.2  | 98.23 | 91.3 |
| 18  | 1/72  | 3.8  | 16.35 | 83.3 |
| *19 | 1/100 | 12.5 | 3.56  | 75.6 |
| *20 | 1/100 | 1.6  | 56.88 | 79.5 |

*Comparative Example

It may be appreciated from Table 1 above that in the cases of samples 5, 7, 8, and 10 to 18 in which the particle diameter ratio and the content ratio of the cobalt (Co) particles to the nickel particles, and the surface oxidation amount of the cobalt (Co) particles as the metal oxide particles satisfy the numerical ranges of the present invention, the electrode connectivity of 80% or higher may be implemented, and electrical properties are excellent.

Meanwhile, it may be appreciated that in the cases of samples 1 to 4, 6, 9, 19 and 20 in which the particle diameter ratio and the content ratio of the cobalt (Co) particles to the nickel particles, and the surface oxidation amount of the cobalt (Co) particles as the metal oxide particles satisfy the numerical ranges of the present invention, the electrode connectivity of 80% or higher may not be implemented.

Figure 5:
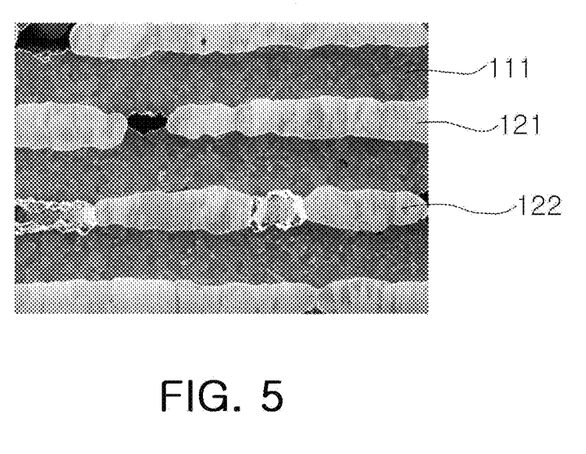
FIG. 5 is a scanning electron microscope (SEM) photograph showing a cross-section of the internal electrode according to the embodiment of the present invention.

FIG. 5 is a scanning electron microscope (SEM) photograph showing a cross-section of the internal electrode according to the embodiment of the present invention.

It may be appreciated from FIG. 5 that the internal electrode according to the embodiment of the present invention does not have a ceramic additive and a pore therein but is formed only the conductive metal.

Therefore, according to the embodiment of the present invention, the internal electrode is formed of only the conductive metal, such that the thicknesses of the internal electrode and the dielectric layer may be reduced and the connectivity of the internal electrode may be improved to thereby implement a design capacitance.

As set forth above, according to the embodiment of the present invention, as an additive added to a paste for an internal electrode, a metal oxide capable of being reduced during a sintering process are used, such that the internal electrode may be formed of only the conductive metal to allow for decreases in thicknesses of the internal electrode and the dielectric layer and to improvements in connectivity of the internal electrode, thereby implementing a design capacitance.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic body including dielectric layers;
internal electrodes disposed in the ceramic body to face each other with the dielectric layers interposed therebetween, and having an average thickness of 1.0 µm or less; and
external electrodes formed on outer surfaces of the ceramic body and electrically connected to the internal electrodes,
wherein at least one of the internal electrodes contains a conductive metal formed of nickel (Ni) particles and metal particles having oxidation resistance higher than that of the nickel (Ni) particles, and a ceramic additive is not present in the at least one of the internal electrodes, and
wherein when an average particle diameter of the nickel (Ni) particles is defined as Dn and an average particle diameter of the metal particles having oxidation resistance higher than that of the nickel (Ni) particles is defined as Ds, $1/72 \leq Ds/Dn \leq 1/2$ is satisfied.

2. The multilayer ceramic electronic component of claim 1, wherein the metal particles having oxidation resistance higher than that of the nickel (Ni) particles are particles of at least one selected from a group consisting of cobalt (Co) and copper (Cu).

3. The multilayer ceramic electronic component of claim 1, wherein a content ratio of the metal particles having oxidation resistance higher than that of the nickel (Ni) particles, to the nickel (Ni) particles, is 1.0% or greater and 25.0% or less.

4. The multilayer ceramic electronic component of claim 1, wherein the metal particles having oxidation resistance higher than that of the nickel (Ni) particles have a surface oxidation amount of 1.0 wt % to 100 wt % based on 100 wt % of the metal particles having oxidation resistance higher than that of the nickel (Ni) particles.

5. A multilayer ceramic electronic component comprising:
a ceramic body including dielectric layers;
internal electrodes disposed in the ceramic body to face each other with the dielectric layers interposed therebetween, and having an average thickness of 1.0 µm or less; and
external electrodes formed on outer surfaces of the ceramic body and electrically connected to the internal electrodes;
wherein at least one of the internal electrodes contains a conductive metal, and a ceramic additive is not present in the at least one of the internal electrodes, and
wherein when a ratio of a length of a portion of each internal electrode in which the internal electrode is actually formed, to the entire length of the internal electrode is defined as connectivity (C) of the internal electrode, the connectivity (C) of 80% or higher is satisfied.

6. A multilayer ceramic electronic component comprising:
a ceramic body including dielectric layers;
internal electrodes disposed in the ceramic body to face each other with the dielectric layers interposed therebetween, and having an average thickness of 1.0 μm or less; and
external electrodes formed on outer surfaces of the ceramic body and electrically connected to the internal electrodes,
wherein the internal electrodes have metal oxide particles added to conductive metal particles, and
wherein when an average particle diameter of the conductive metal particles is defined as Dn and an average particle diameter of the metal oxide particles is defined as Ds, $1/72 \leq Ds/Dn \leq 1/2$ is satisfied.

7. The multilayer ceramic electronic component of claim 6, wherein the metal oxide particles are particles of at least one selected from a group consisting of cobalt (Co) and copper (Cu).

8. The multilayer ceramic electronic component of claim 6, wherein a content ratio of the metal oxide particles to the conductive metal particles is 1.0% or greater and 25.0% or less.

9. The multilayer ceramic electronic component of claim 6, wherein the metal oxide particles have a surface oxidation amount of 1.0 wt % to 100 wt % based on 100 wt % of the metal oxide particles.

10. A multilayer ceramic electronic component comprising:
a ceramic body including dielectric layers;
internal electrodes disposed in the ceramic body to face each other with the dielectric layers interposed therebetween, and having an average thickness of 1.0 μm or less; and
external electrodes formed on outer surfaces of the ceramic body and electrically connected to the internal electrodes;
wherein the internal electrodes have metal oxide particles added to conductive metal particles, and wherein when a ratio of a length of a portion of each internal electrode in which the internal electrode is actually formed, to the entire length of the internal electrode is defined as connectivity (C) of the internal electrode, the connectivity (C) of 80% or higher is satisfied.

* * * * *